April 17, 1928.

H. CLEMENT ET AL 1,666,406

OPTICAL INSTRUMENT

Filed Nov. 7, 1922

Inventors
HANS CLEMENT
BERNARD M. BARRON

By their Attorneys
Stockbridge & Borst

April 17, 1928.  H. CLEMENT ET AL  1,666,406
OPTICAL INSTRUMENT
Filed Nov. 7, 1922   3 Sheets-Sheet 2
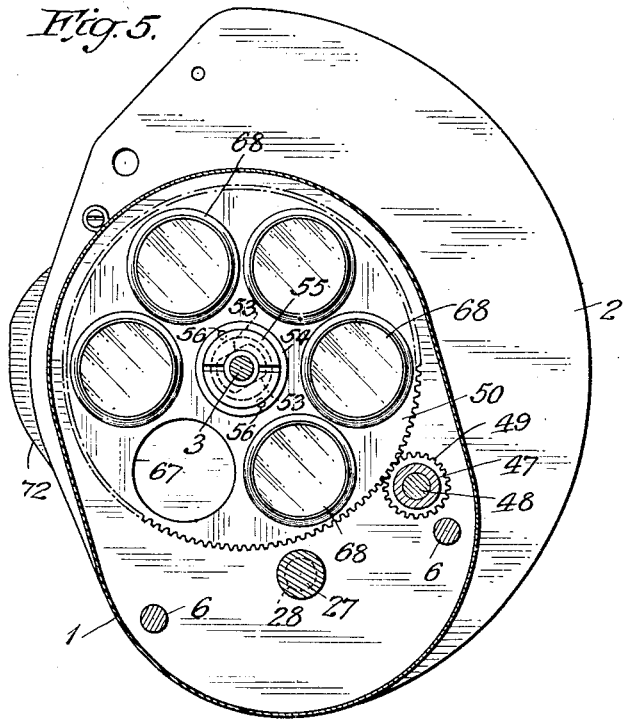
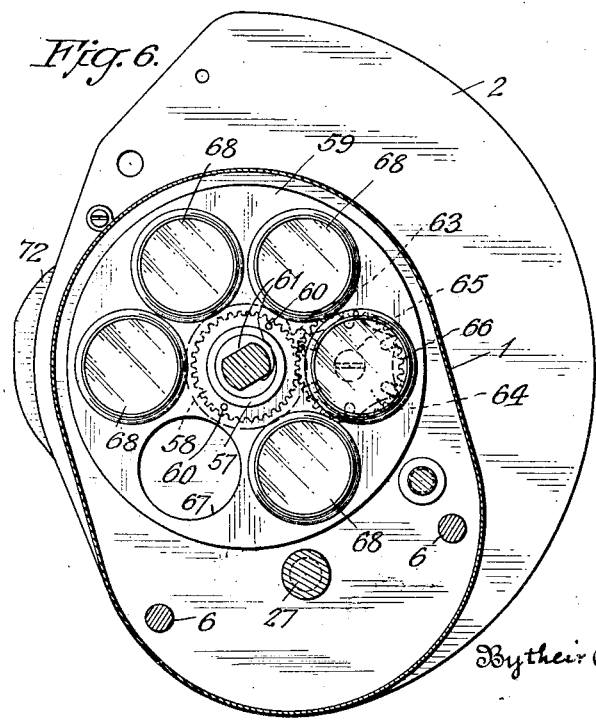
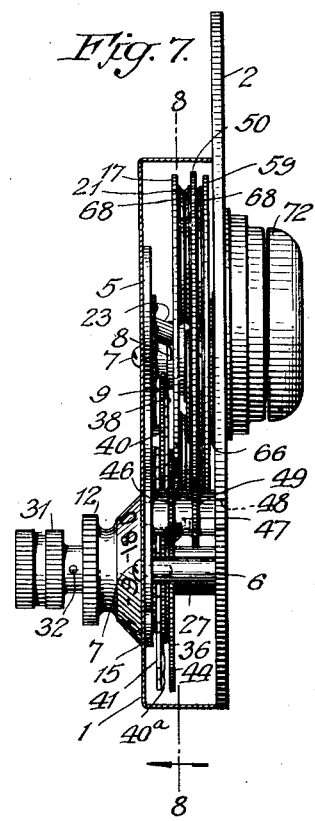
Inventors
HANS CLEMENT
BERNARD M. BARRON
By their Attorneys
Stockbridge & Borst Inventors
HANS CLEMENT
BERNARD M. BARRON
By their Attorneys Patented Apr. 17, 1928.

1,666,406

UNITED STATES PATENT OFFICE.

HANS CLEMENT, OF NEW YORK, AND BERNARD M. BARRON, OF MOUNT VERNON, NEW YORK, ASSIGNORS TO GENERAL OPTICAL COMPANY, INC., A CORPORATION OF NEW YORK.

OPTICAL INSTRUMENT.

Application filed November 7, 1922. Serial No. 599,601.

This invention relates to optical instruments for use in the determination of the lens values or powers necessary to properly correct defective vision of a patient. An object of the invention is the provision of an improved instrument for this purpose in which a large number of different lenses may be readily positioned before an eye of a patient, singly or in various combinations, whereby a maximum variance in the power of the lenses or lens combinations before the eye can be obtained with a minimum number of lenses, and which is exceedingly simple, compact, light in weight, durable, convenient to manipulate and use, and comparatively inexpensive. A further object is to provide an instrument of this type with improved means for bringing the various lenses into eye examination positions in a simple and rapid manner, and for indicating in a restricted area the power of the lenses in eye examination positions at any time. Other objects and advantages will be apparent from the following description of an embodiment of the invention and the novel features will be particularly pointed out hereinafter in claims.

In the accompanying drawings:

Figure 5 is a sectional elevation of the same taken substantially along the line 5—5 of Figure 4;

Figure 6 is a sectional elevation of the same taken substantially along the line 6—6 of Figure 4;

Figure 7 is an end elevation of the same with a portion of the casing in section to show the interior of the casing;

Figure 1:
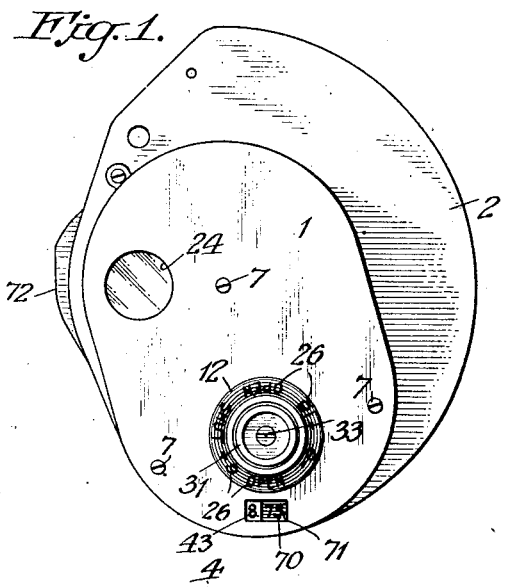
Figure 1 is a front elevation of an instrument constructed in accordance with the invention.

In the illustrated embodiment of the invention the casing which serves as the support for the operating parts is formed of a box 1 which is closed by a plate 2 that forms a side wall thereof. A stud 3 extends between the side walls of the casing and is provided with a square end 4 which fits into a square aperture in one of the walls such as the plate 2. A frame plate 5 is supported in spaced relation to the plate 2 and adjacent the inner face of the side wall of the casing 1, by studs 6 and the stud 3, the box 1 being secured to the plates by screws 7 which pass through a wall of the box and are threaded into the ends of the studs 3 and 6.

Figure 4:
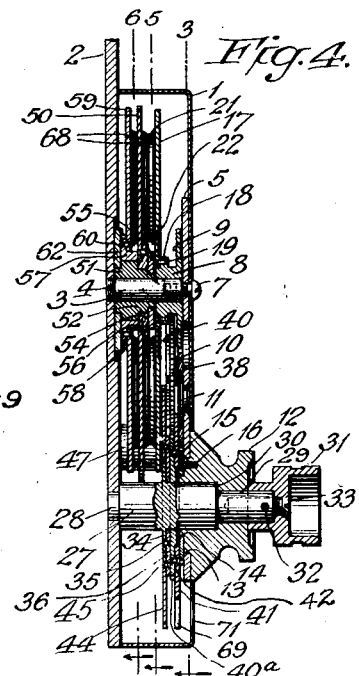
Figure 4 is a transverse sectional elevation of the same taken substantially along the line 4—4 of Figure 3.

A bushing 8 is rotatably mounted upon the stud 3 adjacent the frame plate 5, and carries a peripheral flange 9 with gear teeth in the periphery thereof. The teeth of the flange mesh with an idler pinion 10 which is rotatably carried by a stud 11 provided upon the inner face of the frame plate 5. An operating button 12 has an extension or portion 13 of reduced diameter, (see Fig. 4), which reduced portion or extension passes through and is rotatably mounted in an aperture in the frame plate 5. The extension 13 of the button 12 is provided with a still further reduced extension 14 upon which an annular gear 15 is secured by means of screws 16 which pass through the annular gear into the end face of the extension 13. The annular gear 15 overlaps the extension 13 so that by overlapping the aperture in the frame plate 5 in which the button 12 is mounted, it serves to prevent removal of the button 12 from the aperture.

The gear 15 meshes with and drives the idler 10. When the button 12 is rotated, the annular gear 15 will rotate therewith and through the idler 10 will rotate the bushing 8 upon the stud 3. A disc 17 has an aperture which receives the bushing 8 and abuts against a flange 18 thereof, being secured to the flange for rotation therewith in any suitable manner such as by rivets 19 which pass through and connect the flange and the disc.

The disc 17 is provided between its center and periphery with a circularly arranged row of apertures 20, in all but one or two of which, lenses 21 are mounted. In the illustration, two of the apertures 20 are lensless and the remaining apertures carry lenses of different power therein. The disc also has a blank space 17ª in which there is no aperture.

The face of the disc 17 toward the flange 9 is provided with a plurality of radially extending grooves or depressions 22 which are angularly arranged to correspond to the arrangement of the apertures 20 and the blank space in the disc. A spring plate 23 is secured at one end to the inner face of the frame plate 5 and at its other end has a tongue pressing upon the face of the disc 17 which has therein the radial depressions, so as to snap into the depressions successively as the disc is rotated and yieldingly hold the disc in different angular positions. The casing is provided with a sight opening 24 therethrough (Fig. 1) which may be formed by aligned apertures in the opposite side walls of the casing, and this sight opening is so placed in the casing that the apertures 20 and the blank space 17ª of the disc 17 will be brought successively into alignment therewith as the disc is rotated with the bushing 8 and about the axis of the stud 3. The spring plate 23 is placed upon the plate 5 so as to engage in one of the radial depressions 22 whenever one of the apertures 20 or the blank space 17ª is in alignment with the sight opening 24. The spring plate 23 thus serves to yieldingly hold the disc 17 in positions in which either one of the apertures 20 or the blank 17ª is in alignment with the sight opening 24 of the casing, and will yield and permit rotation of the disc 17 when sufficient torque is applied thereto through operation of the button 12.

The frame plate 5 is provided with an aperture 25 in alignment with the sight opening 24 of the casing so as to provide unobstructed vision through the sight opening. The periphery of the button 12, adjacent the face of the casing, is provided with suitable indicia 26 for indicating the power of the lens which, at any time, is in alignment with the sight opening 24, or for indicating the fact that a lensless aperture or the blank space 17ª of the disc is in alignment with the sight opening 24.

A stem or spindle 27 passes transversely through the casing and has an end 28 of reduced diameter which is rotatably mounted in the wall 2 of the casing. At its other end the stem or spindle passes through and is rotatably mounted in the button 12 axially thereof. For a portion of its distance within the button 12 the stem 27 is of reduced diameter, as at 29, so as to provide a shoulder 30 which abuts against a corresponding shoulder in the passage of the button 12 in which it is mounted. An operating button 31 is secured upon and fixed to an outward extension of the reduced portion 29 of the stem 27 in any suitable manner such as by a pin 32 which passes transversely through the button and reduced portion of the stem. A screw 33 may also be passed endwise through the button 31 and threaded into the end of the portion 29 of the stem 27 for additionally securing the button to the stem.

Figure 2:
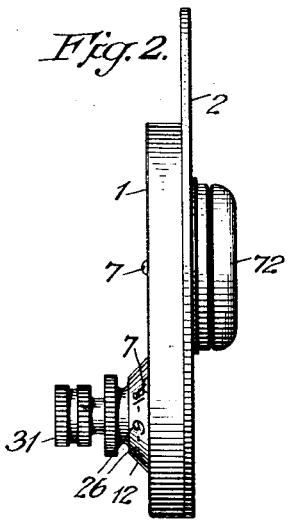
Figure 2 is a side elevation of the same.
Figure 3:
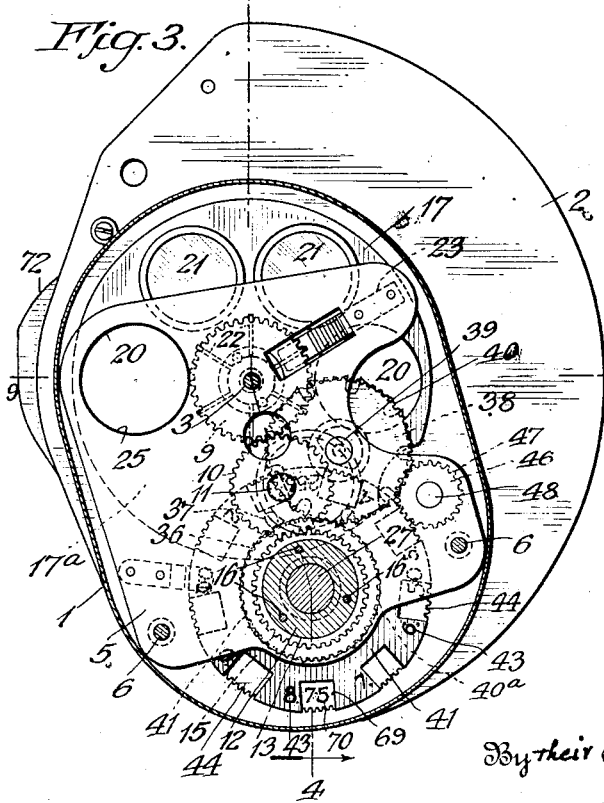
Figure 3 is a front sectional elevation of the same taken substantially along the line 3—3 of Figure 4.
Figure 8:
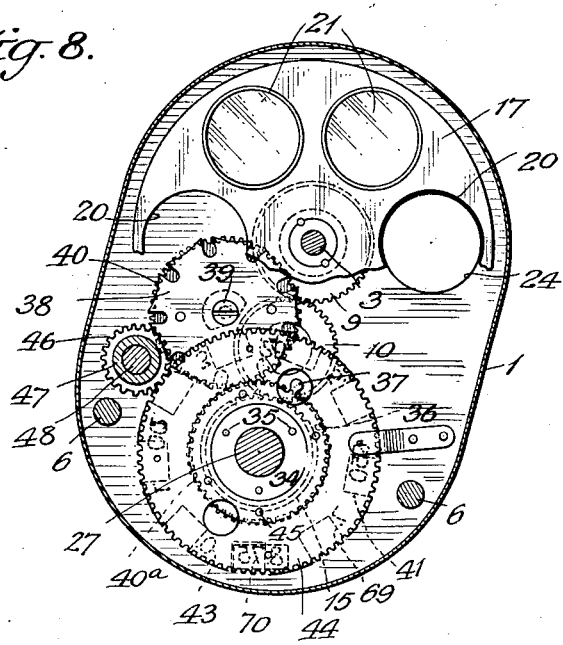
Figure 8 is a section of the same taken substantially along the line 8—8 of Figure 7.

The stem 27 (see Figs. 2 and 8) is provided with a peripherally extending flange 34, to one face of which is secured, such as by the rivets 35, a disc 36 fitting over the stem, and the disc 36 is provided upon its periphery with a single tooth 37 which serves as a Geneva transfer tooth. This tooth 37, together with the disc 36 may be considered as a Geneva pin plate or transfer member. A disc 38 having notches in its periphery is mounted for rotation upon a stud 39 carried by the frame plate 5, so that the single tooth 37 (Figs. 3 and 8) in rotating with the disc 36 will engage in the notches of the disc 38 and impart an increment of rotation thereto for each rotation of the disc 36.

The periphery of the disc 38 between the notches is concave and the periphery of the disc 36 enters the concavity therein at all times except when the tooth 37 is in engagement with one of the slots. This locks the disc 38 against rotation except during its movement by the tooth 37 and is a feature well known in a transfer mechanism.

A gear 40 is secured to and rotates with the disc 38 and meshes with and drives a gear 40ª, which is rotatably mounted upon the stem 27 between the button 12 and the flange 34 of the stem. An annulus or disc 41 is secured by rivets 42 to a face of the gear 40ª for rotation therewith, and carries upon its periphery suitable indicating indicia 43 for indicating powers of lenses as hereafter to be explained.

Figure 9:
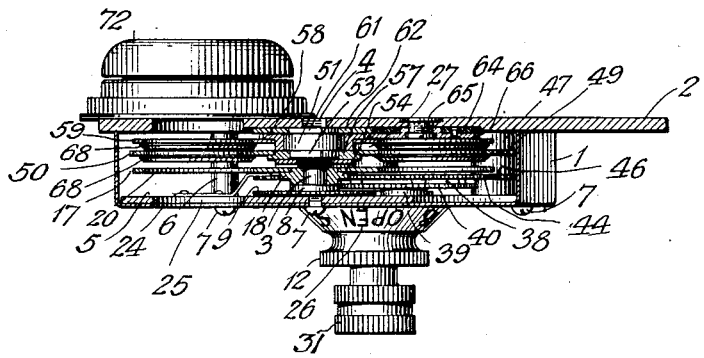
Figure 9 is a section of the same taken substantially along the line 9—9 of Figure 3.

An annular gear disc 44 is placed in the plane of and surrounding the flange 34 of the stem 27 so as to abut against one face of the Geneva pin plate 36, and is secured to the plate 36 by rivets 45 so as to rotate therewith. The annular gear 44 meshes with and drives a pinion 46 (Figs. 3, 5, 7, 8 and 9) which is mounted upon a sleeve 47. The sleeve 47 is rotatably mounted upon a stud 48 extending between the plates 2 and 5. A pinion 49 is also mounted upon the sleeve 47 for rotation therewith and meshes with peripheral teeth of a lens carrying disc 50. A bushing or sleeve 51 (Figs. 4 and 9) is rotatably mounted upon the stud 3 between the sleeve 8 and the plate 2 and is provided with a reduced shoulder 52 which is flattened on opposite sides as at 53 (Fig. 5). A small disc 54 closely fits over the reduced shoulder 52 with an aperture corresponding to the periphery of the reduced shoulder of the bushing, and is held against displacement therefrom by a nut 55 which is threaded upon the inner end of the bushing 51 and abuts against the face of the disc 54 so as to confine it against the shoulder of the sleeve 51. The lens carrying disc 50 is secured to the disc 54 in a suitable manner such as by rivets 56, so that the lens carrying disc 50, the disc 54 and the sleeve or bushing 51 will all rotate together as a unit upon the stud 3.

A sleeve 57 is rotatably mounted upon the bushing 51 between the plate 2 and the disc 50, and is provided upon the end adjacent the plate 2 with a peripheral flange 58 having gear teeth in its periphery. A lens carrying disc 59 is mounted upon the sleeve 57, abutting against the peripheral flange thereof, and is secured to the flange by rivets 60. The end of the sleeve or bushing 51 abutting the plate 2 is reduced in diameter and flattened upon two opposite sides as at 61, and a plate 62 fits closely over upon this reduced end of the sleeve or bushing so as to rotate therewith, the plate being held against displacement therefrom by the plate 2 which abuts against the face of the stem. The plate 62 carries a tooth 63 which is adapted to engage successively in the peripheral notches of a Geneva plate transfer disc or member 64 that is rotatably mounted upon a stud 65 carried by the plate 2, and impart an increment of rotation to the member 64 at each revolution of the plate 62. A gear 66 is secured to and rotates with the member or disc 64, and meshes with the peripheral teeth of the flange 58 of the sleeve 57 so that for each rotation of the sleeve or bushing 51, the tooth 63 rotating therewith will operate the Geneva disc or member 64, and the gear 66 secured thereto, through an increment of rotation. This increment of rotation is transmitted from the gear 66 through the sleeve 57 to the lens carrying disc 59.

Each of the lens carrying discs 50 and 59 is provided between its center and periphery with a central row of apertures 67 which, when the disc rotates about the stud 3, will be brought successively into alignment with the sight opening 24 of the casing. Lenses 68 are mounted in all but one of the apertures of each disc 50 and 59 so that the rotation of the disc will carry them successively into alignment with the sight opening 24 of the casing. The lenses of the disc 50 beginning next to the lensless aperture thereof, have powers of ¼, ½, ¾, 1 and 1¼ diopters respectively and the lenses of the disc 59 beginning next to the lensless aperture thereof, have powers of 1½, 3, 4½, 6 and 7½ diopters respectively.

The disc 41 is provided in its periphery with notches 69, adjoining the indicia 43 thereof, so as to expose to view suitable indicia 70 which may be carried by the annular gear 44 in a position to be visible through the notches 69 and be read with the indicia 43 as a combined direct reading. The casing is provided with an indicator sight opening 71 through which the indicia 43 and 70 may be read successfully as the disc 41 and the annular gear 44 are rotated. An eye piece 72 may be secured to the casing with the aperture of the eye piece in alignment with the lens sight opening 24, for a purpose well known in the art.

In the use of the instrument, it is supported before the patient's face with the lens sight opening 24 and the eye piece 72 directly in front of the eye to be examined. When the indicia 26 on the button 12, such as "open" is immediately above and adjoining the indicator aperture 71, the oculist knows that one of the apertures 20 of the disc 17 which has no lens will be in alignment with the sight opening 24 and thus none of the lenses in the disc 17 will have any effect upon the examination of the eye. Assuming that the discs 50 and 59 are also in an angular position such that the lensless apertures thereof will also be in alignment with the sight opening 24, the light rays can pass through the sight opening and the eye piece without modification. In these positions of the discs 50 and 59, the reading through the indicator sight opening 71 will be zero, that is, 0.00.

If now the stem 27 is rotated by the button 31, the annular gear 44 which rotates therewith will, through the pinions 46 and 49, drive the disc 50 so as to bring the lenses thereof successively into alignment with the eye piece and lens sight opening 24. As the lenses of the disc 50 move successively into alignment with the eye piece the indicia 70 of the disc 44 also move successively into view through the indicator sight opening 71 so as to indicate the power of the lens of disc 50 then in alignment with the eye piece and lens sight opening.

With the powers of the lenses selected for the disc 50, these readings will be successively .25, .50, .75, 1, and 1.25. When the one diopter lens moves into examination position, and while the disc 44 is carrying its indicia .75 out of view and .00 into view a transfer occurs between the discs 44 and 41, through the parts 37, 38, 40 and 40ª, so that the disc 41 will be moved through an increment of rotation sufficient to carry the indicia 1 thereof into view through the indicator sight opening, thus giving the reading 1.00. As the disc 50 completes its rotation and while its lensless aperture is moving into alignment with the lens sight opening 24, a transfer occurs between discs 50 and 59 through the transfer members 62, 63, 64, 65 and 57, whereby the disc 59 will be rotated through an angular distance sufficient to bring one of its lenses adjoining the lensless aperture thereof into alignment with the sight opening 24. During this transfer the disc 44 will move through one increment of movement so as to provide a reading of 1.50 through the indicator sight opening 71, which indicates that the lens then in alignment with the sight opening has a power of 1½ diopters.

As the disc 50 is further rotated, its lenses will be again brought successively into alignment with the sight opening 24 so as to add their refractive effect to that of the first lens of the disc 59. Thus, as the lens of disc 50 having the ¼ diopter power moves into examination position, the combined average power will be 1.75 diopters, which is the sum of the powers of the two aligned lenses. During this increment of movement of the disc 50 which carries the ¼ diopter lens into examination position, the disc 44 will be given an increment of movement so as to bring the indicia .75 into visibility through the indicator sight opening 71. This reading of .75 taken with the indicia reading of 1. of the disc 41 is 1.75 diopters, which thus affords a direct reading in a single numeral of the combined powers of the lenses then in examination positions before the sight opening. Further rotation of the disc 50 will result in similar changes, and at all times the numbers visible through the indicator sight opening 71 will directly indicate by a single numeral the powers of any lenses of the discs 50 and 59 which are in examination position at any time.

In the embodiment illustrated, the powers of the lenses can be varied from 1 to 8.75 diopters in increments of ¼ diopter change. If lens combinations different from those provided for by discs 50 and 59 are desired, the button 12 may be rotated so as to in turn rotate the disc 17 and carry the lenses thereof into examination positions. These lenses will then add their effect to those of the discs 50 and 59. For example if a lens value of plus 9 diopters is desired, the button 31 is manipulated to position the lensless apertures of the discs 50 and 59 in alignment with the lens sight opening, and the button 12 is then manipulated until the plus 9 indicia on the periphery of the button is directly adjoining the indicator sight opening 71. In that position, the lens in alignment with the sight opening of the instrument will have a plus 9 diopter strength.

If greater powers of lenses are desired, the button 31 may be manipulated to bring the lenses of the discs 50 and 59 into examination positions so as to add their powers or effects to those of the lens of the disc 17. A mental computation will be necessary in this case for determining the combined power of the lenses in all three discs which are then in examination position from the reading upon the periphery of the button 12 and the reading in the indicator sight opening 71. The disc 17 also carries, in the illustrated embodiment, a minus 9 diopter lens as well as a minus 18 diopter lens. By positioning either of these lenses before the eye piece, to wit, in examination position, their effect alone can be had when the lensless apertures of the discs 50 and 59 are in examination positions, and the combined effects may be obtained by manipulating the button 31 to set up any combination of lenses in the discs 50 and 59. By combining a minus 9 diopter lens in the disc 17 with a plus 4 diopter combination of the lenses in the disc 50 and 59, one would know by simple computation that the net or combined effect of the lenses in all three discs would be minus 5 diopters. With the minus 9 and minus 18 lenses, all lens powers, either of plus or minus, which are likely to be useful in the ordinary examination of eyes, will be provided for. If one desires to block off the vision through a battery, the button 12 may be manipulated to bring the blank space 17ª thereof opposite the lens sight opening, which obstructs vision through the same.

The instrument as marketed usually has both right and left batteries, only one of which is shown, so that one may be used for each eye, and thus the eyes may be examined simultaneously or separately. The blank space 17ª is placed before the sight opening when vision through one battery only is desired. The blank space 17ª is before the lens sight opening 24 when the word "shut" on the periphery of the button 12 is adjoining the indicator sight opening 71.

By having the transfer means between the two lens discs 50 and 59 separate from that between the two indicator discs 41 and 44, it is possible to obtain a direct decimal reading through the indicator sight opening of the powers of the lenses then in examination position, and the lenses in the discs 50 and 59 can be arranged so as to occupy all of the available openings, so as to range for example, from ¼ to 1¼ diopters. If a strictly decimal system were employed, with a transfer means common to both lens discs and indicator discs, two of the apertures of the disc 50 which are occupied by the one and the 1¼ diopter lenses would need to be omitted, the others repositioned, the one diopter lens would have to be introduced at the beginning of the series in the disc 59, and this series would need to advance by single whole unit diopter steps, 0.00, 1.00, 2.00, 3.00, etc. Obviously such an arrangement would greatly limit the range of the instrument for a given size thereof. It will therefore be obvious that for any two discs of a given size a greater range of lens combinations can be afforded by the separate transfer means for the indicating mechanism and for the lens changing mechanism.

It will be noted that the indicating disc 44 carries the four indicia .00, .25, .50 and .75; while the indicating disc 41 carries the nine indicia 0., 1., 2., 3., 4., 5., 6., 7. and 8., all of which may be decimally combined with the indicia on the other disc 44 to produce single direct readings, which could not be accomplished by showing as an indication numbers representing the diopter powers of the lenses themselves, since many of such powers do not combine decimally. In the particular instrument shown it is noted that such instances occur at nineteen of the thirty-six examination positions of the combined lens carrying discs 50 and 59. For example, at the 8th position the indicating device automatically adds together the lens powers .25 and 1.50 to give the direct reading of 1.75; at the 17th position the lens powers 1.00 and 3.00 are similarly added in a direct indication of 4.00; at the 22nd position the respective lens powers .75 and 4.50 are automatically added and indicated by the single decimal numeral 5.25; and at the final or 36th examination position, which is that shown in the drawings (Figs. 3 and 8), the combined power of the respective lens powers 1.25 and 7.50 are indicated by the displayed single numeral 8.75.

It will be seen that without such automatic computation and indication of the combined powers of the lenses, the operator would be compelled to make a mathematical calculation, with consequent loss of time, tiring of the patient and liability of error. For example, .75 and 4.50 could hardly be instantly mentally added.

Although obvious, it may be noted that it is immaterial to this invention whether fractional diopter lens powers are indicated as decimal fractions or as common fractions. For example, the indication of 8.75 could as well appear as 8¾. However, decimal fractions are commonly used, being more quickly and easily read. Also obviously it is immaterial whether the lens values to be combined are plus or minus, or both.

It is to be noted that the intermediate or idler gears 46 and 49 positively connect together and compel the concomitant operation of the first indicating disc 44 and the first lens carrying disc 50. The relative rates of rotative movement of the lens carrying disc 50 and the indicating disc 44 will be in the ratio of two-to-three, respectively, that is, the lens carrying disc 50 will make two rotations while the indicating disc 44 is making three rotations, corresponding respectively to the six sight apertures in the disc 50 and the four indicia on the disc 44. The transfer movement from the lens carrying disc 50 to the lens carrying disc 59 is in the ratio of one-to-six, corresponding to one rotation of the disc 50 for each of the six sight apertures in the disc 59. The transfer movement from the indicating disc 44 to the indicating disc 41 is in the ratio of one-to-nine, corresponding to one rotation of the disc 44 for each of the nine indicia on the disc 41.

It should be understood that the indicating device itself is not necessarily limited to the two number wheels or indicating discs 44 and 41 with the transfer means between them, but that, within the scope of the invention, the indicating device might be differently constructed to give similar indications while at the same time still preserving a corresponding operating connection with the first lens carrying disc, such as 50.

For the purpose of simplicity the invention is disclosed as employed in an instrument having only spherical lenses, and while it may be marketed as such, it may be and preferably is combined with a cylindrical lens system, such as shown in our copending application Serial No. 595,511, filed October 19th, 1922, (Patent No. 1,596,717, Aug. 17, 1926), the combined instrument being shown generally in our copending application Serial No. 580,796, filed August 9, 1922, (Patent No. 1,568,586, Jan. 5, 1926).

It is obvious that various changes in the details and arrangements of parts herein described and illustrated for the purpose of explaining the nature of the invention may be made by those skilled in the art within the principle and scope of our invention.

We claim:

1. In an optical instrument, a support, a plurality of lens carrying members carried by said support for movement relatively thereto, each member mounting a plurality of lenses adapted to be brought successively into eye examination positions as the members are moved relatively to the support, transfer means between the members for actuating one of them to bring a new lens into examination position at the completion of a given extent of movement of the other member, means including a manually operated spindle for moving said other member to carry the lenses thereof successively into examination positions, an indicating element rotatable with the spindle, a second indicating element rotatably mounted on the spindle, transfer means between the second element and spindle whereby the second element will be driven by increments of rotation at a less rate than the first element, said elements carrying indicia which read together to indicate directly the combined power of the lenses in examination positions at any time.

2. In an optical instrument, a supporting frame having spaced plates, a plurality of overlapping lens carrying elements, means for supporting said elements from the plates for movement relatively to the plates, a button rotatably mounted in one of the plates and connected to operate one of the lens carrying elements to carry the lenses thereof successively into examination positions, an operating stem rotatably mounted in the other plate, passing axially through and having bearing in the button, and connected to operate another of the lens carrying elements and carry its lenses successively into examination positions, and transfer means between the stem driven lens-carrying element and another of said elements whereby the latter will be given an increment of rotation after a determined movement of the former.

3. In an optical instrument, a supporting frame having spaced plates, a plurality of overlapping lens carrying elements, means for supporting said elements from the plates for movement relatively to the plates, a button rotatably mounted in one of the plates and connected to operate one of the lens carrying elements to carry the lenses thereof successively into examination positions, an operating stem rotatably mounted in the other plate, passing axially through and having bearing in the button, and connected to operate another of the lens carrying elements and carry its lenses successively into examination positions, transfer means between the stem driven lens carrying element and another of said elements whereby the latter will be given an increment of rotation after a determined movement of the former, and indicating devices driven at different rates by said stem and carrying thereon indicia which indicate directly the combined power of the lenses of the elements operated from the stem that are in examination position at any time.

4. In an optical instrument, a supporting frame having spaced plates, a plurality of overlapping lens carrying elements, means for supporting said elements from the plates for movement relatively to the plates, a button rotatably mounted in one of the plates and connected to operate one of the lens carrying elements to carry the lenses thereof successively into examination positions, an operating stem rotatably mounted in the other plate, passing axially through and having bearing in the button, and connected to operate another of the lens carrying elements and carry its lenses successively into examination positions, transfer means between the stem driven lens carrying element and another of said elements whereby the latter will be given an increment of rotation after a determined movement of the former, an indicating disc carried by the stem for rotation therewith, a second disc rotatably mounted on the stem, and transfer means between the discs for imparting increments of rotation to the second disc from the stem after a given annular movement thereof, said discs carrying indicia which read together to indicate directly the combined power of the lenses of the elements operated from the stem that are in examination positions at any time.

5. In an optical instrument, a supporting frame having spaced plates, a plurality of overlapping lens carrying elements, means for supporting said elements from the plates for movement relatively to the plates, a button rotatably mounted in one of the plates and connected to operate one of the lens carrying elements to carry the lenses thereof successively into examination positions, an operating stem rotatably mounted in the other plate, passing axially through and having bearing in the button, and connected to operate another of the lens carrying elements and carry its lenses successively into examination positions, transfer means between the stem driven lens carrying element and another of said elements whereby the latter will be given an increment of rotation after a determined movement of the former, an indicating disc carried by the stem for rotation therewith, a second disc rotatably mounted on the stem, and transfer means between the discs for imparting increments of rotation to the second disc from the stem after a given angular movement thereof, said discs carrying indicia which read together to indicate directly the combined power of the lenses of the elements operated from the stem that are in examination positions at any time, said button also having indicia thereon which are displayed in close proximity to the readings on the discs to indicate the power of the lens of the element driven by the button which is in examination position at any time, whereby computation of the combined power of the lenses of all the elements which are in examination position at any time is facilitated.

6. In an optical instrument, a plurality of overlapping lens carrying elements individually movable, a pair of concentric operating members, one member connected to one of the elements to move the same and carry the lenses thereof successively into examination positions, the other member connected to another of the elements to move the same and carry the lenses thereof into examination positions, and transfer means between the last named element and another element for imparting increments of movement to the latter so as to bring its lenses successively into examination positions.

7. In an optical instrument, a plurality of overlapping lens carrying elements individually movable, a pair of concentric operating members, one member connected to one of the elements to move the same and carry the lenses thereof successively into examination positions, the other member connected to another of the elements to move the same and carry the lenses thereof into examination positions, transfer means between the last named element and another element for imparting increments of movement to the latter so as to bring its lenses successively into examination positions, and indicating devices driven at different rates by said other member and carrying thereon indicia which indicate directly the combined power of the lenses of the elements operated by said other member that are in examination position at any time.

8. In an optical instrument, a plurality of overlapping lens carrying elements individually movable, a pair of concentric operating members, one member connected to one of the elements to move the same and carry the lenses thereof successively into examination positions, the other member connected to another of the elements to move the same and carry the lenses thereof into examination positions, transfer means between the last named element and another element for imparting increments of movement to the latter so as to bring its lenses successively into examination positions, an indicating disc carried by the said other member for rotation therewith, a second disc rotatably mounted on said other member, and transfer means between the discs for imparting increments of rotation to the second disc after a given angular movement of the first disc, said discs carrying indicia which read together to indicate directly the combined power of the lenses of the elements operated from the said other member that are in examination positions at any time.

9. In an optical instrument, a plurality of overlapping lens carrying elements individually movable, a pair of concentric operating members, one member connected to one of the elements to move the same and carry the lenses thereof successively into examination positions, the other member connected to another of the elements to move the same and carry the lenses thereof into examination positions, transfer means between the last named element and another element for imparting increments of movement to the latter so as to bring its lenses successively into examination positions, an indicating disc carried by the said other member for rotation therewith, a second disc rotatably mounted on said other member, and transfer means between the discs for imparting increments of rotation to the second disc after a given angular movement of the first disc, said discs carrying indicia which read together to indicate directly the combined power of the lenses of the elements operated from the said other member that are in examination positions at any time, said one member having indicia thereon which are displayed in close proximity to the readings on the discs to indicate the power of the lens of the element driven thereby which is in examination position at any time, whereby computation of the combined powers of all lenses of all elements in examination position at any time is facilitated.

10. In an optical instrument, a plurality of overlapping lens carrying elements individually movable to carry the lenses thereof successively into examination positions, an operating stem connected to one of the elements to operate the same, transfer means between the elements to impart increments of movement to the other of the elements from said one of the elements after a given extent of movement thereof, an indicating member driven directly by the stem, a second indicating member, and means independent of said transfer means by which the second indicating member is driven at a given ratio to the first indicating member, said indicating members having thereon indicia which cooperate with one another to provide direct readings of the combined power of the lenses of the elements which are in examination positions at any time.

11. In an optical instrument, a support having a pair of spaced plates, an operating button having a portion of reduced diameter passing through and having bearing in one of the plates, the shoulder at the reduced portion by abutting against the face of said one plate preventing displacement of the button in one direction from its bearing in the plate, a gear secured to the end of the reduced portion of the button and overlapping with the inner face of the said one plate for preventing displacement of the button in the other direction from its bearing in the plate, a spindle rotatably mounted in the other of the plates and passing through and having bearing in said button, a gear carried by the spindle in the space between the plates, a disc rotatably mounted on the spindle between the button and the gear on the spindle and having gear teeth, transfer means between the disc and the gear on the spindle whereby the disc will be driven from the spindle at a reduced rate, a plurality of overlapping lens carrying members mounted for independent rotation so as to carry the lenses of each member successively into examination positions, a connection between one of the members and the gear on the button whereby the member may be rotated by rotation of the button, and transfer means between the other lens carrying members whereby one will be driven from the other but at a lower rate, the driving lens carrying member being connected to the gear on the spindle to be driven therefrom, and said disc and gear on the spindle having indicia thereon for cooperating together to indicate the powers of the particular lenses of the connected lens carrying members which are in examination positions at any time.

12. In an optical instrument, a supporting frame, a plurality of overlapping lens carrying members carried by the frame for independent rotation, two concentrically disposed operating members adapted for independent rotation, one of the operating members being connected to one of the lens carrying members for rotating the same and thus carrying its lenses successively into examination positions in said frame, the other of the operating members being connected to another of the lens carrying members for operating the same and thus carrying its lenses successively into examination positions in said frame, transfer means between said another of the lens carrying members and the remaining lens carrying member for operating the same in increments at a lower rate, whereby its lenses will be brought successively into examination positions and aligned with the lenses of the other members which may be in examination positions, indicating means driven from one of the concentric members for indicating directly the combined power of the lenses of the lens carrying members that are connected through the transfer means which may be aligned in examination positions, the other concentric member having indicia which are read in close proximity to the indicating means for indicating the power of any lens of the lens carrying member driven thereby which may be in examination position at any time so as to facilitate mental computation of the combined power of aligned lenses in all of the lens carrying members.

13. In an optical instrument, a support, a plurality of lens carrying members carried by said support for movement relatively thereto, each member mounting a plurality of lenses adapted to be brought successively into eye examination positions as the members are moved relatively to the support, transfer means between the members for actuating one of them to bring a new lens into examination position at the completion of a given extent of movement of the other member, means including a manually operated spindle for moving said other member to carry the lenses thereof successively into examination positions, and indicating devices operable concomitantly with said spindle for indicating by direct readings the combined power of the lenses in examination positions at any time.

14. In an optical instrument, a support, a plurality of lens carrying members carried by said support for movement relatively thereto, each member mounting a plurality of lenses adapted to be brought successively into eye examination positions as the members are moved relatively to the support, transfer means between the members for actuating one of them to bring a new lens into examination position at the completion of a given extent of movement of the other member, means including a manually operated spindle for moving said other member to carry the lenses thereof successively into examination positions, an indicating element rotatable with the spindle, a second indicating element driven at a different rate than the first indicating element when the members are operated by the spindle, said elements carrying indicia which read together to indicate directly the combined power of the lenses in examination positions at any time.

15. In an optical instrument, a supporting frame, a plurality of lens carrying elements supported by said frame for movement into eye examination positions singly and in various optical combinations, transfer means between said elements for actuating one of them to bring a new lens into examination position for each movement of a given extent of the other element, and an indicating device separate from and connected to so as to be operated concomitantly with said other element and including means for indicating by successive direct individual readings the characteristics of the lenses and lens combinations which are in examination positions at any time.

16. In an optical instrument, a supporting frame, a plurality of lens carrying elements supported by said frame for movement into eye examination positions singly and in various optical combinations, transfer means between said elements for actuating one of them to bring a new lens into examination position for each movement of a given extent of the other element, and an indicating device separate from said elements and comprising a plurality of movable indicating members one of which is operated concomitantly with said other element, and transfer means between said members for actuating another of them for each movement of a given extent of said one member, said members having thereon indicia which co-operate with one another to provide direct readings for indicating the characteristics of the lenses and lens combinations which are in examination positions at any time.

17. In an optical instrument, a supporting frame, a plurality of lens carrying elements supported by the frame for movement to carry the lenses thereof into eye examination positions singly and in various optical combinations of lenses arranged in a series on the respective elements, transfer means between said elements for actuating one of them to bring a new lens into examination position for each movement of a given extent of the other element for thereby combining the powers of the lenses carried by the respective elements, the serial arrangement of the lenses being such that the lenses of the respective series do not combine throughout according to a continuous decimal adding of their respective powers, and an indicating device extraneous to and connected to be driven concomitantly with said other element, said device including means for automatically adding together the powers of the combined lenses to give a direct decimal reading of the powers of the lenses and lens combinations which are in examination positions at any time.

In witness whereof, we hereunto subscribe our signatures.

HANS CLEMENT.
BERNARD M. BARRON.